(12) United States Patent
Hinderer et al.

(10) Patent No.: US 10,948,111 B2
(45) Date of Patent: Mar. 16, 2021

(54) CONNECTORS FOR CABLE DUCTS

(71) Applicant: Robert Bosch GmbH, Stuttgart (DE)

(72) Inventors: Mario Hinderer, Fichtenberg Ot Langert (DE); Chandrashekar Radhakrishnan, Bangalore (IN); Shyam Sunder Bhadya, Lohr am Main (DE); Herbert Velten, Tamm (DE); Marco Willi, Benningen am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/238,740

(22) Filed: Jan. 3, 2019

(65) Prior Publication Data
US 2019/0203861 A1    Jul. 4, 2019

(30) Foreign Application Priority Data

Jan. 4, 2018    (DE) .................. 10 2018 200 069.7

(51) Int. Cl.
| | | |
|---|---|---|
| *F16L 25/00* | (2006.01) | |
| *H02G 3/04* | (2006.01) | |
| *F16L 19/00* | (2006.01) | |
| *F16B 7/18* | (2006.01) | |
| *H02G 3/06* | (2006.01) | |
| *H02G 3/08* | (2006.01) | |
| *F16B 2/22* | (2006.01) | |

(52) U.S. Cl.
CPC .......... *F16L 25/0009* (2013.01); *F16B 7/185* (2013.01); *F16L 19/00* (2013.01); *H02G 3/0456* (2013.01); *H02G 3/0608* (2013.01); *H02G 3/081* (2013.01); *F16B 2/22* (2013.01)

(58) Field of Classification Search
CPC ...... H02G 3/0608; H02G 3/081; H02G 3/083; H02G 3/086; H02G 3/06; H02G 3/0616; H02G 3/0691; H02G 3/0487; H05K 5/0247; F16L 25/0009; F16L 19/00; F16B 7/185; F16B 2/22
See application file for complete search history.

(56) References Cited

U.S. PATENT DOCUMENTS

| | | | | |
|---|---|---|---|---|
| 2012/0031640 A1* | 2/2012 | Korcz | ............ | H02G 3/20 174/66 |
| 2015/0357806 A1* | 12/2015 | Korcz | ............ | H02G 3/083 174/541 |

FOREIGN PATENT DOCUMENTS

| | | |
|---|---|---|
| DE | 33 22 102 C2 | 12/1983 |
| DE | 195 09 398 A1 | 9/1996 |
| DE | 10 2013 005 212 A1 | 10/2014 |
| DE | 10 2015 209 321 A1 | 11/2016 |

(Continued)

OTHER PUBLICATIONS

Bosch Rexroth AG, Mechanik-Grundelemente, 13.2, Aug. 2017, Sections 0, 1, 3, and 11.

*Primary Examiner* — Timothy J Thompson
*Assistant Examiner* — Amol H Patel
(74) *Attorney, Agent, or Firm* — Maginot, Moore & Beck LLP (57) ABSTRACT

A connector has five or six abutment surfaces for cable ducts. The cable ducts may have substantially square end faces or rectangular end faces half as large. The connector has a main body made of metal, which exhibits one or two square abutment surfaces or portions thereof, and which exhibits four smaller substantially rectangular abutment surfaces.

16 Claims, 5 Drawing Sheets

(56) References Cited

FOREIGN PATENT DOCUMENTS

EP          0 409 807 A2    1/1991
EP          1 892 809 A1    2/2008

\* cited by examiner

CONNECTORS FOR CABLE DUCTS

This application claims priority under 35 U.S.C. § 119 to patent application number DE 10 2018 200 069.7, filed on Jan. 4, 2018 in Germany, the disclosure of which is incorporated herein by reference in its entirety.

BACKGROUND

The disclosure relates to connectors—so-called nodes—for cable ducts or cable-routing profiles, according to the following description.

In printed publication Mechanik-Grundelemente 13.2, published by the present applicant in 2017, corner brackets and cube-type connectors are disclosed (starting on page 3-42) which are provided for the purpose of connecting the end faces of two or more profiles. Hence trusses can be assembled that form racks, for example. The latter then serve for the attachment of further components. In this case, the profiles, and correspondingly also the connectors, are not suitable for accommodating electrical leads or optical waveguides.

Profiles are also known that provide relatively large interior spaces and that serve as cable ducts. The interior spaces can be opened laterally, in order to insert electrical leads or optical waveguides.

In published German patent publication DE 10 2015 209 321 A1 and in printed publication (already mentioned above) Mechanik-Grundelemente 13.2 (starting on page 11-3), corner connectors and curve elements for cable ducts are disclosed that likewise offer appropriate interior spaces in which the electrical cables or optical waveguides can be installed.

It is a disadvantage of corner connectors and curve elements of such a type that they are only able to connect to one another two cable ducts arranged at an angle to one another, and that their mechanical load-bearing capacity is limited.

Curve elements and T-shaped connectors for cable ducts are presented in printed patent specification DE 33 22 102 C2, wherein the cable ducts have to be aligned by means of additional aligning elements, and additional joint coverings are provided. Hence the connectors are elaborate in terms of apparatus and manufacture and can only be utilized for the predetermined number and arrangement of cable ducts.

In contrast, the object underlying the disclosure is to create a stable connector for cable ducts that is simple in terms of apparatus and manufacture. In particular, the connector is to be capable of being utilized flexibly, and the connection is to be mechanically loadable.

SUMMARY

This object is achieved by a connector for cable ducts that has the features disclosed herein.

Further advantageous configurations of the disclosure are described herein.

The disclosed connector serves for connecting two to six cable ducts which have preferentially been produced as cable-routing profiles from continuously cast aluminum. The connector exhibits a main body on which five or six flat abutment regions for end faces of cable ducts are provided, all of said abutment regions being arranged at right angles to one another. The main body is preferentially made of metal and is therefore particularly stable. At least one abutment region has a square enveloping frame, and at least two abutment regions have a rectangular enveloping frame. The side-length of the square enveloping frame is equal to the longer side-length of the rectangular enveloping frame. With the connector according to the disclosure, a maximum of five or a maximum of six cable ducts—depending upon the embodiment—can be connected to one another within various spatial axes. If, for example, only two cable ducts are to be connected to one another, all conceivable spatial axes are possible. Hence by virtue of its plurality of abutment regions the connector can be employed with maximum flexibility for the connection of differing numbers of cable ducts and for cable ducts directed in differing directions. The front sides of the cable ducts are capable of being attached to the abutment regions by means of screw joints. Hence mechanically loadable connections are capable of being established between the connector and the cable ducts.

The smaller rectangular abutment region is preferentially half as large as the larger square abutment region.

In a first embodiment, which is also designated as a ½-node, the main body exhibits a total of five abutment regions, of which one abutment region has the larger square enveloping frame, whereas the four other abutment regions have the smaller rectangular enveloping frame.

In a further development of the first embodiment of the connector according to the disclosure that is capable of being employed particularly variably, its main body has a right-parallelepipedal enveloping geometry. An interior space of the main body of the first embodiment is preferentially completely hollow, by virtue of which maximum free space is afforded for the electrical leads or optical waveguides installed therein.

In this case, it is preferred if the larger abutment region exhibits a peripheral abutment surface and a central through-recess serving as cable recess. The through-recess is accordingly assigned to the abutment region. The peripheral abutment surface surrounds the through-recess in the manner of a frame and over its full extent. The four smaller abutment regions each exhibit a further abutment surface, at the margin of which a respective further recess. The latter may serve as a portion of a cable recess or as a cable recess. The further recesses are accordingly assigned to the respective abutment region. The peripheral abutment surface of the larger abutment region is delimited on the outside by four edges of the main body, and consequently has a square outer margin. The four further abutment surfaces are each delimited by three edges of the main body and by the margin.

If the configuration of the margins of the further recesses corresponds in each instance to the configuration of a portion of the margin of the through-recess, an advantageous compatibility is afforded for edge-protectors, for example.

In a second embodiment, which is also designated as a ¾-node, the main body has a total of six abutment regions, of which four abutment regions have the larger square enveloping frame, and of which two abutment regions have the smaller rectangular enveloping frame.

In a further development of the second embodiment of the connector according to the disclosure that is capable of being employed particularly variably, its main body has a cube-shaped enveloping geometry.

The main body of the first and second embodiment may be in one piece. An interior space of the main body of the second embodiment is then completely hollow, by virtue of which maximum free space is afforded for the electrical leads or optical waveguides installed therein.

If the main body of the second embodiment is bipartite, it may have been assembled from a main body according to the first embodiment and from a complementary main-body portion. Hence a flexible modular system for connectors can be created, in which the main body of the first embodiment can also be complemented so as to form a main body of the second embodiment. In this case, the main body of the first embodiment and the complementary main-body portion are preferentially attached to one another via two screws arranged in the interior space of the main body.

Two of the four larger abutment regions preferentially each exhibit a peripheral abutment surface and a central through-recess serving as cable recess. The peripheral abutment surfaces surround the respective through-recess in the manner of a frame and over its full extent. Two of the four larger abutment regions each exhibit a further abutment surface, at the margin of which a respective further recess is formed. The two smaller abutment regions likewise each exhibit a further abutment surface, at the margin of which a respective further recess is formed. These four further recesses may serve as a cable recess or as a portion of a cable recess. The two peripheral abutment surfaces and the two further abutment surfaces of the larger abutment regions are each delimited on the outside by four edges of the main body. The two further abutment surfaces of the two smaller abutment regions are each delimited by three edges of the main body and by the margin.

If the configuration of the margins of the further recesses corresponds in each instance to a portion of the margins of the through-recesses, an advantageous compatibility is afforded for edge-protectors, for example.

A complementary part which forms one or two connecting brackets may have been applied onto the main body of the second embodiment. The connecting bracket/brackets complements/complement in each instance one of the further abutment surfaces formed on a larger abutment region, so as to form a peripheral abutment surface. Hence the connecting bracket/brackets also complements/complement the one or the two assigned further recess(es) so as to form respective through-recesses.

For reasons of compatibility and flexibility, at the time of the incorporation of the connector according to the disclosure the recesses are preferentially circular or arcuate. More precisely, in the first embodiment of the main body the margin of the one through-recess, and in the second embodiment of the main body the two margins of the through-recesses, is/are circular, and the margins of the four further recesses are arcuate.

If the end faces of the cable ducts have corresponding screw-in options, the cable ducts can be attached to the various abutment surfaces of the connector by means of screws, in particular by means of self-tapping screws. The screw-in options may be holes or adapted cavities. For this purpose, each peripheral abutment surface exhibits four through-holes, and/or each further abutment surface exhibits two or three through-holes. More precisely, the two larger further abutment surfaces may each exhibit three through-holes, and the two smaller further abutment surfaces may each exhibit two through-holes.

On at least one of the margins, preferentially on all of the margins, an edge protection may have been provided for conserving the margin and/or the cable to be pulled through.

The edge protection may have been formed on an edge-protection element that is capable of being attached to the margin in question, for example by clips.

In the second embodiment of the main body with complementary part, for two of the further recesses the respective edge protection may also have been formed on the complementary part. When the complementary part is applied onto the main body, the two edge-protectors are inserted into the two further recesses.

For visual reasons, those abutment regions of the connector onto which no end faces of cable ducts are applied are covered, preferentially with square covering plates. For this purpose, lugs of the covering plate are preferentially clipped into the through-holes. One of the abutment regions with square enveloping frame can also be used for a holding plate or base plate, to which a foot may have been attached. The holding plate or base plate is preferentially screwed on. For this purpose, use is made of the through-holes of the abutment surface.

If the end face of the cable duct to be attached has a square enveloping frame and is pentagonal, a triangular differential surface arises between the end face and the assigned square enveloping frame of the main body—where appropriate, inclusive of its complementary element. In comparable manner in principle, a triangular differential surface may arise between the base plate and the assigned square enveloping frame of the main body—where appropriate, inclusive of its complementary element. These differential surfaces are preferentially covered by means of corresponding triangular covering laminae. The triangular covering laminae are preferentially clipped into a through-hole of the abutment surface via a lug of the respective covering lamina.

Onto the larger abutment regions with larger square enveloping frame there are preferentially mounted cable ducts, the end faces of which have an equally large square enveloping frame. Onto the smaller abutment regions with rectangular enveloping frame there are preferentially mounted cable ducts, the end faces of which likewise have a smaller rectangular enveloping frame.

By reason of the flexible usability of the connector according to the disclosure, it is also possible to mount an end face of a cable duct with larger square enveloping frame onto an abutment region with small rectangular enveloping frame; it is then preferred if the cable duct exhibits an inner supporting structure that comes into abutment with the small rectangular enveloping frame of the connector, and is attached thereto.

By reason of the flexible usability of the connector according to the disclosure, it is also possible to mount an end face of a cable duct with smaller rectangular enveloping frame onto an abutment region with large square enveloping frame; the rectangular differential surface can then be covered with a rectangular covering plate.

BRIEF DESCRIPTION OF THE DRAWINGS

Several embodiments of a connector according to the disclosure for cable ducts are represented in the figures.

Shown are.

DETAILED DESCRIPTION

Figure 1:
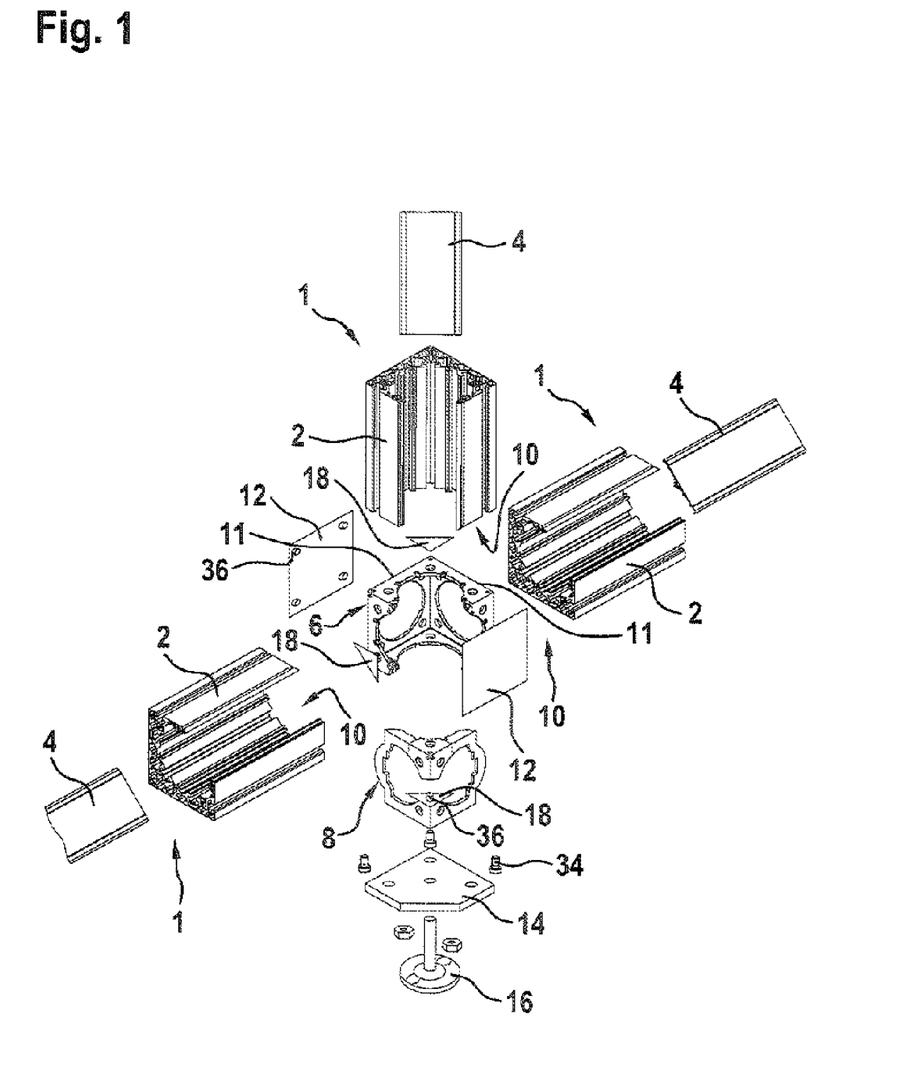
FIG. 1: a first embodiment of the connector according to the disclosure with three cable ducts, in an exploded drawing.

FIG. 1 shows a first embodiment of the connector according to the disclosure with three cable ducts 1, in an exploded drawing. In this application of the connector, two of the cable ducts 1 are arranged in the same direction and in alignment with one another, whereas the third cable duct 1 is arranged perpendicular thereto. Each cable duct 1 has a base body 2, which has been produced as an aluminum extruded profile, and a cover 4. The base body 2 and hence the cable duct 1 have a pentagonal cross-section and a square enveloping frame.

On account of the square enveloping frames of end faces 10 of the cable ducts 1, the connector also has the shape of a cube with several corresponding square enveloping frames 11. More precisely, a main body 6 and a complementary part 8 are provided which jointly form a cube-shaped enveloping geometry and the edges of a cube. In this case, the edge directed forward out of the plane of the drawing in FIG. 1 is not completely constituted by the complementary part 8.

Hence the connector has six flat square abutment regions, of which, in the embodiment shown, an end face 10 of a base body 2 of a cable duct 1 is attached onto three abutment regions in each instance. In each instance a square covering plate 12 is applied onto two abutment regions. Onto the sixth abutment region (the lower one in FIG. 1) a base plate 14 is attached, to the side of which facing away from the connector a foot 16 is attached. The base plate 14 has a shape that corresponds to that of the end faces 10 of the cable ducts 1. The base plates 14 and the end faces 10 each have a pentagonal shape and a square enveloping frame, the size of which corresponds to that of the larger square abutment regions of the connector. Hence triangular differential surfaces remain in each instance between the end faces 10 or the base plate 14 and the corresponding abutment region of the connector. These differential surfaces are covered by respective triangular covering laminae 18.

Figure 2:
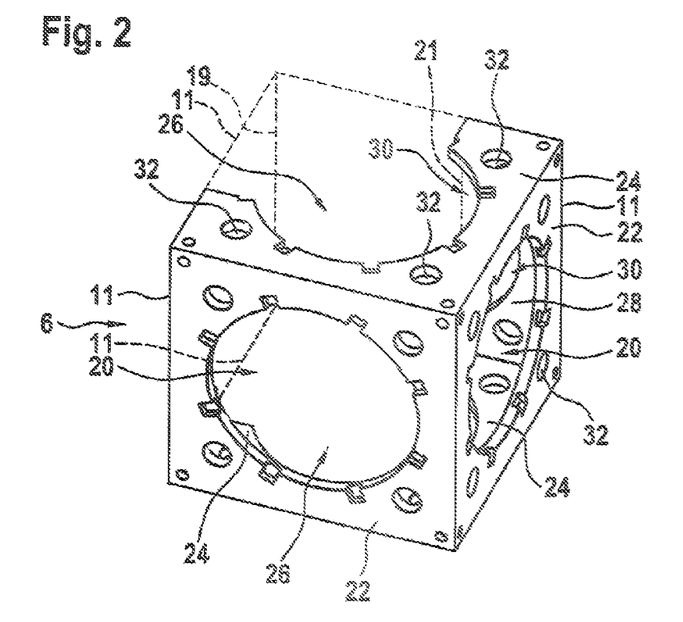
FIG. 2: a main body of the connector from FIG. 1, in a perspective view.

FIG. 2 shows the main body 6 of the connector from FIG. 1 in a perspective representation. Said main body has the cube-shaped geometry 19 already mentioned. On four sides (in FIG. 2, top, bottom, front left and front right) of the total of six sides of the cube-shaped enveloping geometry 19, respective larger square enveloping frames 11 or abutment regions are provided. On two sides of the cube-shaped enveloping geometry 19 (in FIG. 2, rear left and rear right), respective smaller rectangular enveloping frames 21 or abutment regions are provided, of which in FIG. 2 only a dashed boundary can be seen.

Two of the total of four larger square abutment regions (in FIG. 2, front left and front right) each have a central circular through-recess 20 and an abutment surface 22 encircling said through-recess. The two other larger square abutment regions (in FIG. 2, top and bottom) each have a non-peripheral further abutment surface 24 and a further recess 26. The two smaller rectangular abutment regions have been concealed in the representation according to FIG. 2 and will therefore be elucidated with reference to the main body 206 from FIG. 6. Therein (by reason of the reversed representation) the two smaller rectangular abutment regions with a respective dashed boundary line can be discerned. These abutment regions each have a further abutment surface 28 and a further recess 30.

Again with reference to FIG. 2, it can be discerned a through-hole 32 is provided in all four corner regions of each abutment surface 22, 24, 28. The through-holes 32 serve for the attachment of the respective component provided on the abutment region. Screws 34, for example, for the attachment of the base plate 14, or lugs 36 of the covering plates 12 or of the covering laminae 18, are inserted into the through-holes 32. Furthermore, the through-holes 32 are penetrated, in particular, by screws which are not represented and which are screwed into the end faces 10 of the base bodies 2 of the cable ducts 1.

Figure 3:
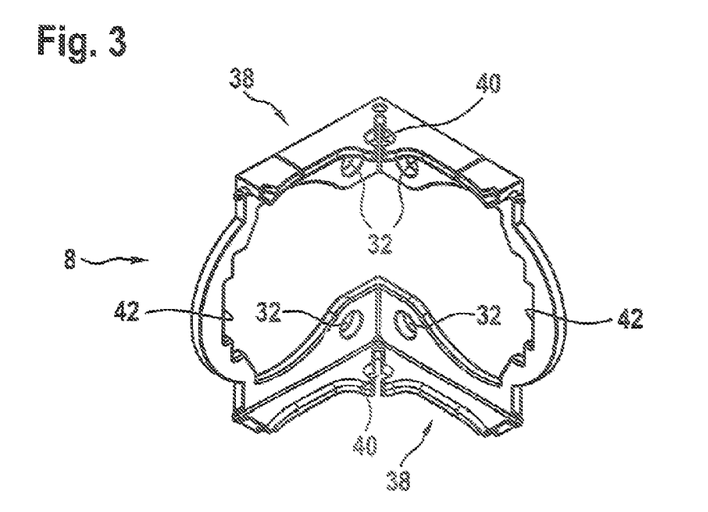
FIG. 3: a complementary part of the connector from FIG. 1, in a perspective view.

FIG. 3 shows the complementary part 8 from FIG. 1, looking toward its inside in a perspective representation. The complementary part 8 has two connecting brackets 38 which complete the two further abutment surfaces 24 (in FIG. 2, top and bottom) so as to form peripheral abutment surfaces, and the two assigned further recesses 26 so as to form central through-recesses. Furthermore, the two connecting brackets 38 enlarge the two further abutment surfaces 28 and make a third and a fourth through-hole 32 available for each abutment surface 28.

In the corners the connecting brackets 38 are slotted, in order to increase the elasticity of the complementary part 8. Further holes 40 are also provided there, which in their size, arrangement and function correspond approximately to the through-holes 32.

The two connecting brackets 38 are connected to one another via two edge-protectors 42 which are inserted into the two further recesses 30 of the two smaller rectangular abutment regions (concealed in FIG. 2). They serve there for conserving the pulled-though electrical leads or the optical waveguides (not shown).

The complementary part 8 with the two connecting brackets 38 and with the two edge-protectors 42 takes the form of a one-piece plastic part.

The main body 6 according to FIG. 2 is open on its region (rear in FIG. 2), so that the electrical leads and/or optical waveguides accommodated in the cable ducts 1 in question can also be routed through the central through-recesses 20 of the main body 6 without difficulty. Even if thereafter the complementary part 8 from FIG. 3 has been inserted into the corresponding region of the main body 6, the one open edge remains on the connector formed in this way.

Figure 4:
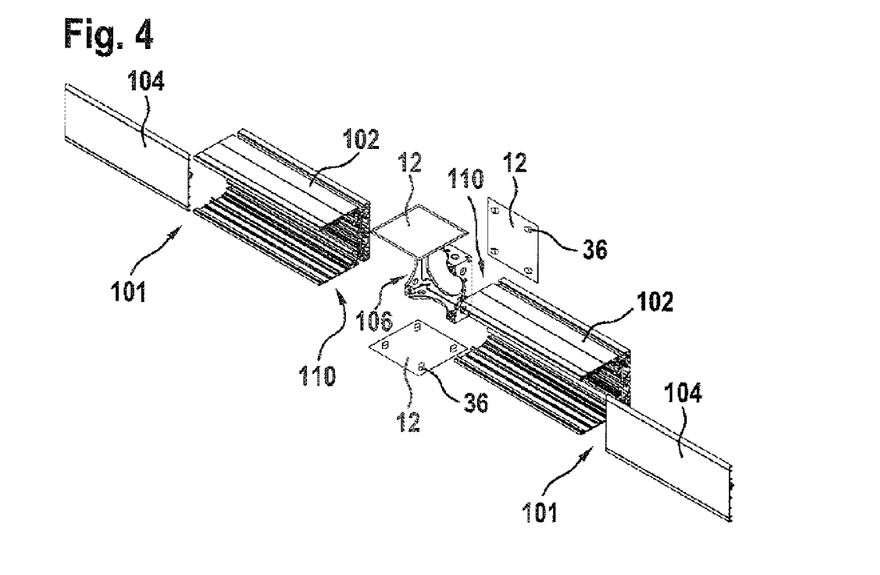
FIG. 4: a second embodiment of the connector according to the disclosure with two cable ducts, in an exploded drawing.

FIG. 4 shows a second embodiment of the connector according to the disclosure with two opposing and mutually aligned cable ducts 101. The latter have square end faces 110 in the embodiment shown, a respective supporting structure being provided in the interior space of the base body 102 on a side situated opposite the respective cover 104.

The connector that is shown generates a stable connection between the cable ducts 101, by the base body 106 shown being connected to the respective supporting structure of the base body 102 via two screws in each instance.

Figure 5:
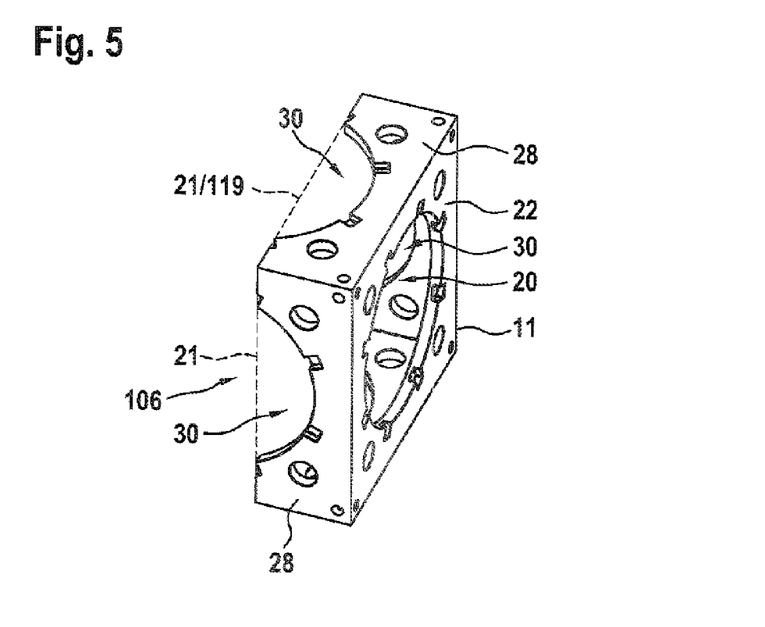
FIG. 5: a main body of the connector from FIG. 4, in a perspective view.

FIG. 5 shows the main body 106 from FIG. 4 in a perspective view. In this second embodiment the main body 106 has been reduced in size in comparison with that of the first embodiment. The main body 106 has a right-parallelepipedal enveloping geometry 119 and only one larger square abutment region with a peripheral abutment surface 22 and with a central through-recess 20 (on the right in FIG. 5). Furthermore, the main body 106 has four smaller rectangular abutment regions (uniformly distributed on the perimeter) with, in each instance, a further abutment surface 28 and a further recess 30.

According to FIG. 4, in each instance a covering plate 12 has been attached onto the peripheral abutment surface 22 and onto two of the four further abutment surfaces 28 via its respective lugs 36.

To the two remaining abutment surfaces 28 the respective cable ducts 101—more precisely, the respective supporting structures of the base bodies 102—have been attached via, in each instance, two screws (not shown).

One of the two covers 104 of the cable ducts 101 has been extended in such a manner that it covers or forms the sixth side of the connector.

Figure 6:
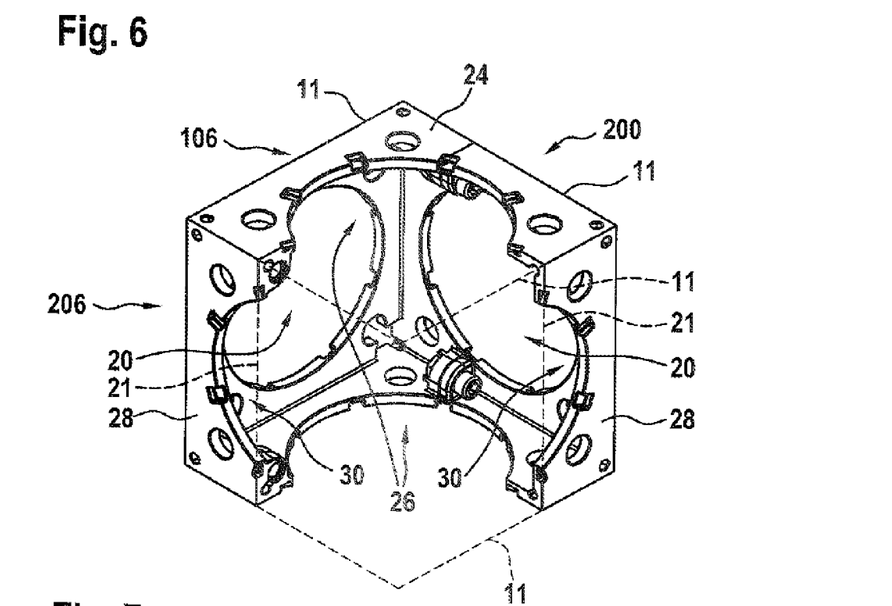
FIG. 6: a main body in a bipartite variant, in a perspective view.

FIG. 6 shows the main body 206 according to a variant with respect to the main body 6 from FIG. 2. In this variant, the main body 206 is of bipartite construction. More precisely, a main body 106 according to the second embodiment from FIG. 5 and a complementary main-body portion 200 have been assembled. For this purpose, two screwed connections are provided in the interior space of the main body 206.

Figure 7:
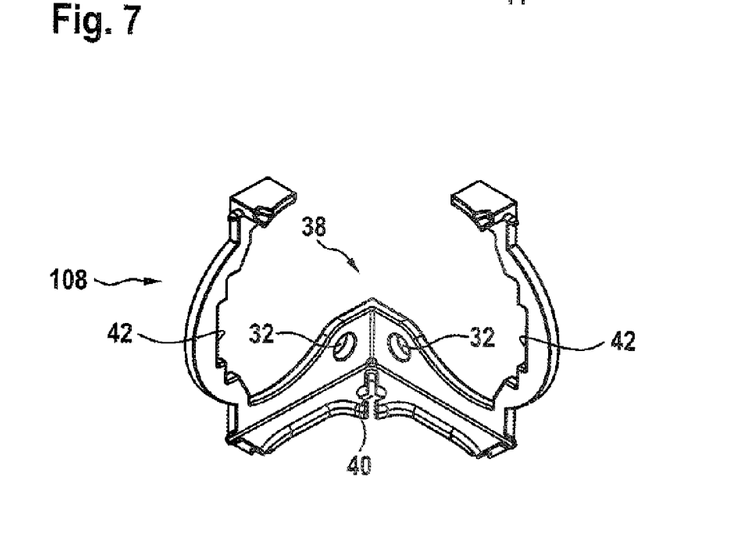
FIG. 7: an alternative complementary part, in a perspective view.

FIG. 7 shows, in a perspective representation, a variant of the complementary part 108. The latter has two edge-protectors 42 and only one connecting bracket 38 with two through-holes 32 and with a further hole 40. The complementary part 108 in this case is provided for the first embodiment of the main body 6 according to FIG. 2 or for the variant 206 thereof according to FIG. 6. With the complementary part 108, one corner of the connector with three edge portions adjacent thereto remains open. A cover (not shown) can be inserted into this corner if three of the cable ducts 1 according to FIG. 1 are arranged directly adjacent to one another on the three abutment regions adjacent to the corner. With the complementary part 108, the introduction of the electrical leads or optical waveguides has been simplified in comparison with the complementary part 8 from FIG. 3.

Figure 8:
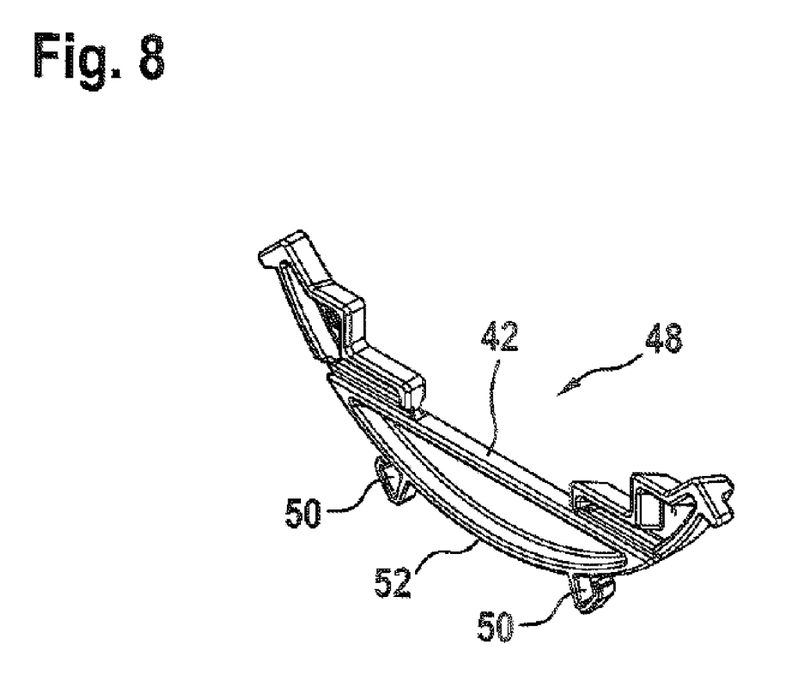
FIG. 8: an edge-protection element, in a perspective view.

FIG. 8 shows, in a perspective view, an edge-protection element 48 made of plastic, which can be inserted into the circular or arcuate recesses 20, 26, 30 of all the main bodies 6; 106; 206 shown. The edge-protection element 48 is equipped with hook-like clamping extensions 50 which can be clipped into notches which are uniformly distributed on the recesses 20, 26, 30. An arcuate outer circumferential surface 52 of the edge-protection element 48 then bears against the recess 20, 26, 30 in question in a substantially gap-free manner.

Disclosed is a connector with five or six abutment surfaces for cable ducts 1; 101, wherein the cable ducts 1; 101 preferentially have substantially square end faces 10; 110 or rectangular end faces half as large. The connector has a main body 6; 106; 206 made of metal, which exhibits one or two square abutment surfaces 22 or portions 24 thereof and which exhibits four smaller substantially rectangular abutment surfaces 28.

LIST OF REFERENCE SYMBOLS

1; 101 cable duct
2; 102 base body
4; 104 cover
6; 106; 206 main body
8; 108 complementary part
10; 110 end face
11 square enveloping frame
12 covering plate
14 base plate
16 foot
18 covering lamina
19 cube-shaped enveloping geometry
20 central through-recess
21 rectangular enveloping frame
22 peripheral abutment surface
24 further abutment surface
26 further recess
28 further abutment surface
30 further recess
32 through-hole
34 screw
36 lug
38 connecting bracket
40 further hole
42 edge protection
48 edge-protection element
50 clamping extension
52 circumferential surface
119 parallelepipedal enveloping geometry
200 main-body portion

What is claimed is:

1. A connector, comprising:
a main body including a number of flat abutment regions configured to abut end faces of cable ducts, the number of flat abutment regions being one of five and six, wherein:
each of the number of flat abutment regions is arranged at right angles to each adjoining flat abutment region of the number of flat abutment regions,
at least one of the number of flat abutment regions has a corresponding square enveloping frame,
at least two of the number of flat abutment regions have a corresponding rectangular enveloping frame,
each side-length of the square enveloping frame corresponds to a longer side-length of the rectangular enveloping frame, and
the number of flat abutment regions are configured to be attached to the end faces of the cable ducts by screw joints.

2. The connector according to claim 1, wherein:
the at least one of the number of flat abutment regions comprises one flat abutment region,
the at least two of the number of flat abutment regions comprises four flat abutment regions, and
the corresponding square enveloping frame of the one flat abutment region is larger than each of the corresponding rectangular enveloping frames of the four flat abutment regions.

3. The connector according to claim 2, wherein the main body has a right parallelepipedal enveloping geometry.

4. The connector according to claim 2, wherein:
the one flat abutment region is larger than each of the four flat abutment regions,
the one flat abutment region exhibits a peripheral abutment surface and a central through-recess,
the peripheral abutment surface surrounds the through-recess in the manner of a frame and over its full extent, and
a respective further recess is formed at a margin of each of the four flat abutment regions.

5. The connector according to claim 4, wherein:
at least one of the screw joint of each peripheral abutment surface exhibits four through-holes, and the screw joint of each further abutment surface exhibits one of two and three through-holes.

6. The connector according to claim 5, wherein the through-holes are penetrated by screws which have been inserted into adapted cavities of the cable ducts.

7. The connector according to claim 1, wherein:
the number of flat abutment regions provided on the main body is six,
four of the six flat abutment regions have square enveloping frames, two of the six flat abutment regions have rectangular enveloping frames, and each of the square enveloping frames is larger than each of the rectangular enveloping frames.

8. The connector according to one of claim 7, wherein the main body has a cube-shaped enveloping geometry.

9. The connector according to claim 7, wherein the main body is bipartite.

10. The connector according to claim 7, wherein:

each of the four of the six flat abutment regions is larger than each of the two of the six flat abutment regions, each of a first and a second of the four of the six flat abutment regions exhibits a peripheral abutment surface and a central through-recess, each of the peripheral abutment surfaces surrounds the respective through-recess in the manner of a frame and over its full extent, each of a third and a fourth of the four of the six flat abutment regions exhibits a further abutment surface, at the margin of which a respective further recess is formed, each of the two of the six abutment regions exhibits a second further abutment surface, at the margin of which likewise a respective second further recess is formed.

11. The connector according to claim 10, wherein:

a complementary part is applied onto the main body, said complementary part exhibits a number of connecting brackets which in each instance develop further the respective one of the further abutment surfaces so as to form a peripheral abutment surface, and develop further the respective further recess so as to form a through-recess, and the number of connecting brackets is one of one and two.

12. The connector according to claim 11, wherein at least one edge protection is provided for at least one of the margins.

13. The connector according to claim 12, wherein the at least one edge protection is formed on an edge-protection element that is configured to be attached to the at least one of the margins.

14. The connector according to claim 12, wherein the edge protection is formed on the complementary part.

15. The connector according to claim 10, wherein:

at least one central through-recess of the first and the second of the four of the six flat abutment regions includes a circular margin, and the margins of the further recesses and second further recesses are arcuate.

16. The connector according to claim 1, further comprising at least one square covering plate.

* * * * *

UNITED STATES PATENT AND TRADEMARK OFFICE
CERTIFICATE OF CORRECTION

PATENT NO. : 10,948,111 B2
APPLICATION NO. : 16/238740
DATED : March 16, 2021
INVENTOR(S) : Hinderer et al.

It is certified that error appears in the above-identified patent and that said Letters Patent is hereby corrected as shown below:

In the Claims

Claim 10, Column 9, Lines 23-24: "of which likewise a respective" should read --of which a respective--.

Claim 11, Column 10, Lines 2-3: "the respective one of the further abutment surfaces" should read --a respective one of the further abutment surfaces--.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*